July 8, 1952     H. E. BIRABEN     2,602,179
WINDSHIELD WIPER MECHANISM
Filed March 13, 1948

Inventor
HENRI EMILE BIRABEN

Patented July 8, 1952

2,602,179

UNITED STATES PATENT OFFICE 2,602,179

WINDSHIELD WIPER MECHANISM

Henri Emile Biraben, Lansing, Mich., assignor to General Motors Corporation, Detroit, Mich., a corporation of Delaware Application March 13, 1948, Serial No. 14,702
In Great Britain April 11, 1947

6 Claims. (Cl. 15—253)

1

This invention relates to windshield wiper mechanism for vehicles, such as motor road vehicles, ships, boats, aircraft, railway engines and the like.

It is usual for multiple wipers to be driven from a common power source, such as a vacuum motor, an electric motor or an engine through transmission mechanism. This present invention is concerned with such tandem-driven wipers and the basis of the invention is a flexible, two-part cable push-pull connection between the cranks of the wiper arm spindles.

By such an interconnection the wiper arms move in opposite directions; structural factors impose no limitations as they do with other connections; and there need not be a strict parallelism between the arm spindles, so that it facilitates the arrangement and driving of wipers on non-planar V-shaped and curved windshields on motor or other vehicles.

One preferred construction of a wiper mechanism is shown by way of example in the accompanying drawings, in which.

Figure 1:
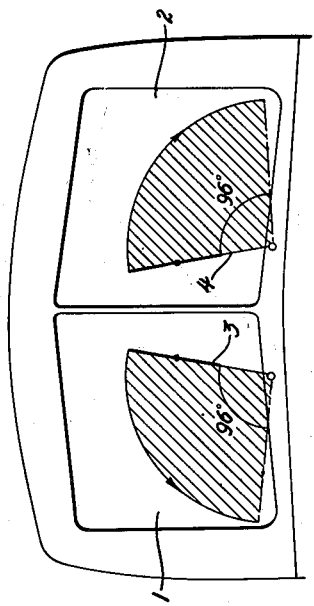
Figure 1 is a diagrammatic view of the windshield of a motor vehicle, showing the general disposition and range of movement of the wiper blades.
Figure 2:
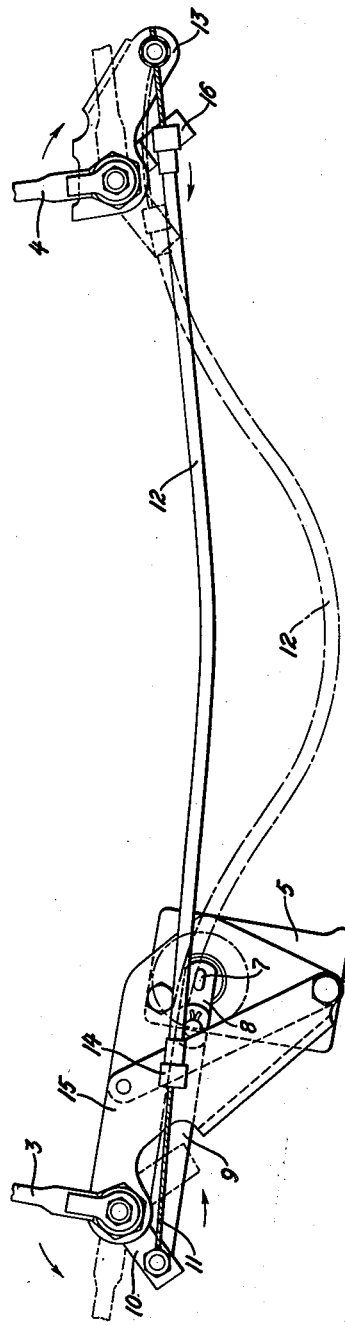
Figure 2 is a front elevation of the drive mechanism.
Figure 3:
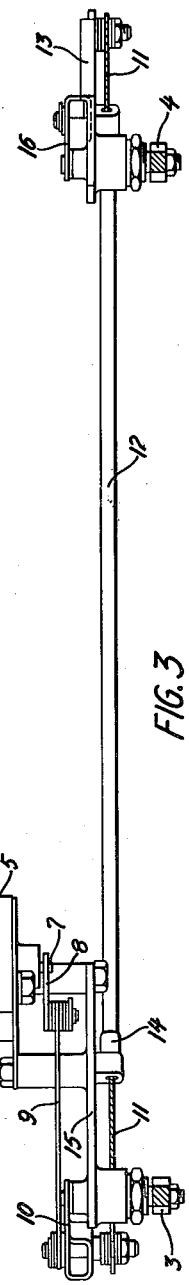
Figure 3 is a plan of the same.

As indicated above, the drive mechanism is particularly useful on vehicles having V-shaped windshields, and it is so hereinafter described as mounted on a motor road vehicle, the upper front portion of which is shown in Figure 1. Each of the relatively inclined panes 1, 2 of the windshield has wiper arms 3, 4 respectively, driven by a common power source through mechanism according to this invention and as shown in detail in Figures 2 and 3. The arms 3, 4 each move through approximately 96° and are simultaneously in the full-line positions and the dotted-line positions shown. They thus move in opposite rotational directions.

Any source of driving power can be used: suction, electrical or mechanical from the engine. In the construction shown in Figures 2 and 3 a mechanical drive device 5 is shown by way of example, the motive power being transmitted from the engine (not shown) through a flexible cable 6. The drive device 5 has a rotatable shaft 7 carrying a crank 8 which is connected by means of a link 9 to the crank 10 of the nearmost wiper arm 3. The end of the wiper arm crank 10 is fastened to one end of the core

2 member 11 of a flexible two-part cable 12, whose other end is anchored to a bracket 13 adjacent the second wiper arm 4. The outer sheath member 14 of the flexible two-part cable 12 is anchored to a bracket 15 adjacent the first wiper arm 3, whilst its other movable end is attached to the end of the second wiper arm crank 16.

The flexible cable is such that both parts will transmit thrust and tension, and in this way and by leaving some slack between the two cranks, a push (rightward, for example) on the core member 11 at its left-hand end results in a counter movement (leftward, for example) of the sheath 14 at its right-hand end. Thus a clockwise 180° rotation of the driving crank 8 from the position shown will effect a rightward push on the cable core 11 and a downward counter-clockwise sweep of arm 3, and a simultaneous leftward pull on the cable sheath 14 and a downward clockwise sweep of arm 4. The arms 3 and 4 will be in the lower, dotted line positions of Figure 1, and the cable 12 will be in the bowed, slack position shown in dotted lines in Figure 2.

Continued rotation of the crank 8 through 180° to the position shown will effect a leftward pull on the left-hand end of the cable core 11 and a rightward push on the right-hand end of the cable sheath 14, and consequent upward and opposite sweeps of the arms 3 and 4 to the full-line positions. The cable 12 then resumes its substantially straight condition. Thus the two wiper arms move in opposite rotational directions on spindles which can be, but need not be, parallel.

Obviously the interconnections of sheath and core with the respective cranks can be interchanged; it is immaterial which is the effective driving member.

I claim:

1. Windshield wiper mechanism for vehicles, multiple wipers each having a spindle and a crank a flexible two-part cable having means to guide said parts in a fixed transverse relation to each other during relative axial movement, the opposite ends of each part of the cable being respectively fixed and attached to the cranks of the wiper arm spindles, a source of driving power one of the cranks being attached to the source of driving power.

2. Windshield wiper mechanism for vehicles, multiple wipers each having a crank, a flexible cable having a core member and a sheath member, one end of one of said members being attached to the crank of one wiper and its other end being fixed adjacent the other wiper, one end of said other member being fixed adjacent said one wiper and its other end being attached to the crank of said other wiper, so that when one of the wipers is driven the other wiper will be oppositely moved.

3. In a windshield wiper mechanism, a frame, a driving windshield wiper mounted in said frame and having a crank, a driven windshield wiper mounted in said frame and having a crank, a two-part flexible cable, one part being attached at one end to one crank and at the other end to the frame and the other part being attached at one end to the frame and at the other end to the other crank.

4. In a windshield wiper mechanism, a pair of windshield wipers, drive means connected to each of said windshield wipers, said drive means being supported by a bracket, a two-part flexible cable, said parts being axially slidable but fixed transversely with respect to each other, one part being connected at one end to one drive means and at the other end to said bracket, the other part being connected at one end to said bracket and at the other end to said other drive means.

5. In a windshield wiper mechanism, a pair of windshield wiper shafts, supports for said shafts, a two-part flexible member having means to allow relative axial displacement but prevent relative transverse displacement between the parts, one part having securing means at one end anchoring said one part to the support adjacent one shaft and driving means at the other end connected to the other shaft to rotate said shaft, and the other part having securing means at the other end anchoring said other part to the support adjacent the said other shaft and driving means at the said one end connected to the said one shaft to rotate the shaft.

6. In a windshield wiper mechanism, a support, windshield wipers mounted on said support and having driving means, said wipers and driving means extending in substantially opposite directions, said driving means being mounted on the support, a flexible drive member secured to the driving means of one wiper and to the support adjacent the other wiper, a second flexible drive member secured to the driving means of the other wiper and to the support adjacent the one wiper, and means to hold said flexible members in fixed transverse relation to each other but allow relative axial sliding to drive said wipers in opposite directions.

HENRI EMILE BIRABEN.

REFERENCES CITED

The following references are of record in the file of this patent:

UNITED STATES PATENTS

| Number | Name | Date |
|---|---|---|
| 1,284,523 | Williams | Nov. 12, 1918 |
| 1,856,416 | Hueber | May 3, 1932 |
| 2,180,442 | Honduer | Nov. 21, 1939 |
| 2,191,356 | Snell | Feb. 20, 1940 |
| 2,259,790 | Auten | Oct. 21, 1941 |
| 2,264,242 | Horton | Nov. 25, 1941 |
| 2,319,408 | Korte | May 18, 1943 |
| 2,356,424 | Paton | Aug. 22, 1944 |

FOREIGN PATENTS

| Number | Country | Date |
|---|---|---|
| 3,697 | Great Britain | of 1905 |